(12) United States Patent
Adabala et al.

(10) Patent No.: US 8,238,651 B2
(45) Date of Patent: Aug. 7, 2012

(54) IMAGE-GUIDED ABSTRACTION OF BUILDING FACADES

(75) Inventors: Neeharika Adabala, Bangalore (IN); Aniruddha Loya, Bhopal (IN); Amitava Das, Bangalore (IN); Pragyana K. Mishra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1063 days.

(21) Appl. No.: 12/142,806

(22) Filed: Jun. 20, 2008

(65) Prior Publication Data

US 2009/0304297 A1 Dec. 10, 2009

Related U.S. Application Data

(60) Provisional application No. 61/059,267, filed on Jun. 5, 2008.

(51) Int. Cl.
*G06K 9/00* (2006.01)
(52) U.S. Cl. ...................................................... 382/162
(58) Field of Classification Search .......... 382/162–167, 382/154, 284; 345/419–420, 426, 582, 589, 345/473, 469; 701/438
See application file for complete search history.

(56) References Cited

U.S. PATENT DOCUMENTS

| | | | |
|---|---|---|---|
| 5,844,568 A | 12/1998 | Luther | |
| 6,124,864 A | 9/2000 | Madden et al. | |
| 6,639,594 B2 | 10/2003 | Zhang et al. | |
| 6,965,690 B2 | 11/2005 | Matsumoto | |
| 6,983,082 B2 | 1/2006 | Duiker | |
| 7,218,792 B2 * | 5/2007 | Raskar et al. | ................. 382/254 |
| 8,046,167 B2 * | 10/2011 | Mishra et al. | ................. 701/438 |
| 2004/0236543 A1 | 11/2004 | Stephens | |
| 2005/0128212 A1 | 6/2005 | Edecker et al. | |
| 2008/0304735 A1 * | 12/2008 | Yang et al. | .................... 382/164 |
| 2010/0020077 A1 * | 1/2010 | Kumakura et al. | ........... 345/420 |

OTHER PUBLICATIONS

Mayer, et al., "Building Façade Interpretation from Image Sequences", In: Stilla U, Rottensteiner F, Hinz S (Eds) CMRT05. IAPRS, vol. XXXVI, Part 3/W24, Aug. 29-30, 2005, p. 55-60.
Cula, et al., "Compact Representation of Bidirectional Texture Functions", 2001, 2 pages, http://csdl2.computer.org/persagen/DLAbsToc.jsp?resourcePath=/dl/proceedings/&toc=comp/proceedings/cvpr/2001/1272/01/1272toc.xml&DOI=10.1109/CVPR.2001.990645.
Finkenzeller, et al., "Rapid modeling of complex building façades", 2006, 4 pages.
Oliva, et al., "Modeling the Shape of the Scene: A Holistic Representation of the Spatial Envelope", International Journal of Computer Vision 42(3), 145-175, 2001, Jan. 22, 2001, pp. 145-175.
Buchholz, et al., "Real-Time Non-Photorealistic Rendering of 3D City Models", 2005, 11 pages.
DeCarlo, et al., "Stylization and Abstraction of Photographs", SIGGRAPH 2002, pp. 769-776.

(Continued)

*Primary Examiner* — Ishrat I Sherali

(57) ABSTRACT

To reduce the amount of storage space and computing power required to render image data, particularly building image data, primary and secondary colors may be extracted from the image data. The image data may be re-rendered using only the primary and secondary colors. The re-rendered image may be evaluated for patterns, the patterns thresholded to bi-level data and a Discrete Fourier Transform (DFT), or equivalent, may be performed on the bi-level data. Low order coefficients may be discarded depending on level accuracy desired. DFT coefficients and color data for the primary and secondary colors may then be used to construct an abstraction of the original image data, using data that is, in some cases, three or four orders of magnitude smaller than the original image data.

19 Claims, 11 Drawing Sheets

OTHER PUBLICATIONS

Dollner, et al., "Real-Time Expressive Rendering of City Models", Proceedings of the Seventh International Conference on Information Visualization (IV'03), 2003, 6 pages.

Frueh, et al., "Automated Texture Mapping of 3D City Models With Oblique Aerial Imagery", Proceedings of the 2nd International Symposium on 3D Data Processing, Visualization, and Transmission (3DPVT'04), 2004, 8 pages.

"Google Earth—Broadband, 3d Application", 2 pages, http://earth.google.com.

Legakis, et al., "Feature-Based Cellular Texturing for Architectural Models", 2001, 8 pages.

John Peter Lewis, "Texture Synthesis for Digital Painting", Computer Graphics vol. 18, No. 3, Jul. 1984, 7 pages.

"Virtual Earth 3d—Online Map Service", http://maps.live.com.

Muller, et al., "Image-Based Procedural Modeling of Facades", Proceedings of ACM SIGGRAPH 2007, 9 pages.

Muller, et al., "Procedural Modeling of Buildings", Proceedings of ACM SIGGRAPH 2006, 10 pages.

Parish, et al., "Procedural Modeling of Cities", Proceedings of ACM SIGGRAPH 2001, 8 pages.

Rusinkiewicz, et al., "Exaggerated Shading for Depicting Shape and Detail", 2006, 7 pages.

Santella, et al., "Abstracted Painterly Renderings Using Eye-Tracking Data", In the International Symposium on Non Photorealistic Animation and Rendering (NPAR) 2002, pp. 75-82.

Santella, et al., "Visual Interest and NPR: an Evaluation and Manifesto", In NPAR 2004, 8 pages.

Wonka, et al., "Instant Architecture", ACM Transactions on Graphics, vol. 22, No. 4, Jul. 2003, p. 669-677.

* cited by examiner

Fourier Coefficients and
Image Abstraction

US 8,238,651 B2

IMAGE-GUIDED ABSTRACTION OF BUILDING FACADES

This application claims the benefit of U.S. Provisional Application No. 61/059,267, entitled "IMAGE-GUIDED ABSTRACTION OF BUILDING FACADES," filed on Jun. 5, 2008, which is hereby incorporated by reference herein.

BACKGROUND

Mapping products have developed many new ways to deliver location information related to specific localities. Among those are dynamic map scrolling, satellite views, and street-level photographs. Delivery of some of these applications is limited to higher performance end points because smaller, less powerful devices do not have the memory or processing power to store or render large amounts of high resolution graphics.

Similarly, gaming applications may use artistic renderings of buildings or scenery using complex polygons that may also tax smaller or less powerful delivery platforms.

SUMMARY

When photo-realistic images of buildings and natural features are not supportable, or simply not desirable, the storage size and power required for rendering, a building or other patterned objects, may be reduced by building a model built that presents a recognizable rendering of the building in terms of major colors and patterns. Using such modeling, the data required for transmission and storage may be reduced to a fraction of that required for a photographic quality image or complex polygon model.

A photographic or polygon image of a building may be analyzed for color content and the major colors identified. Similarly, patterns may be analyzed for width and period across both horizontal and vertical directions. Skew in the photograph may be accounted for and a parametrically driven mathematical model of the building may be developed. When transmission is required, only the color description and equation coefficients may be sent that allow a simple projection to be constructed that represents the building or feature of interest.

In an exemplary embodiment, an exterior building wall with one or more patterns of windows and walls may be represented photographically with an image from several hundred kilobytes to several megabytes, or more depending on color depth and resolution. By reducing the image to a model with a numerical representation of several dominant colors and a list of Fourier transform coefficients, the representation may be reduced to a size ranging from less than 100 bytes to several kilobytes.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
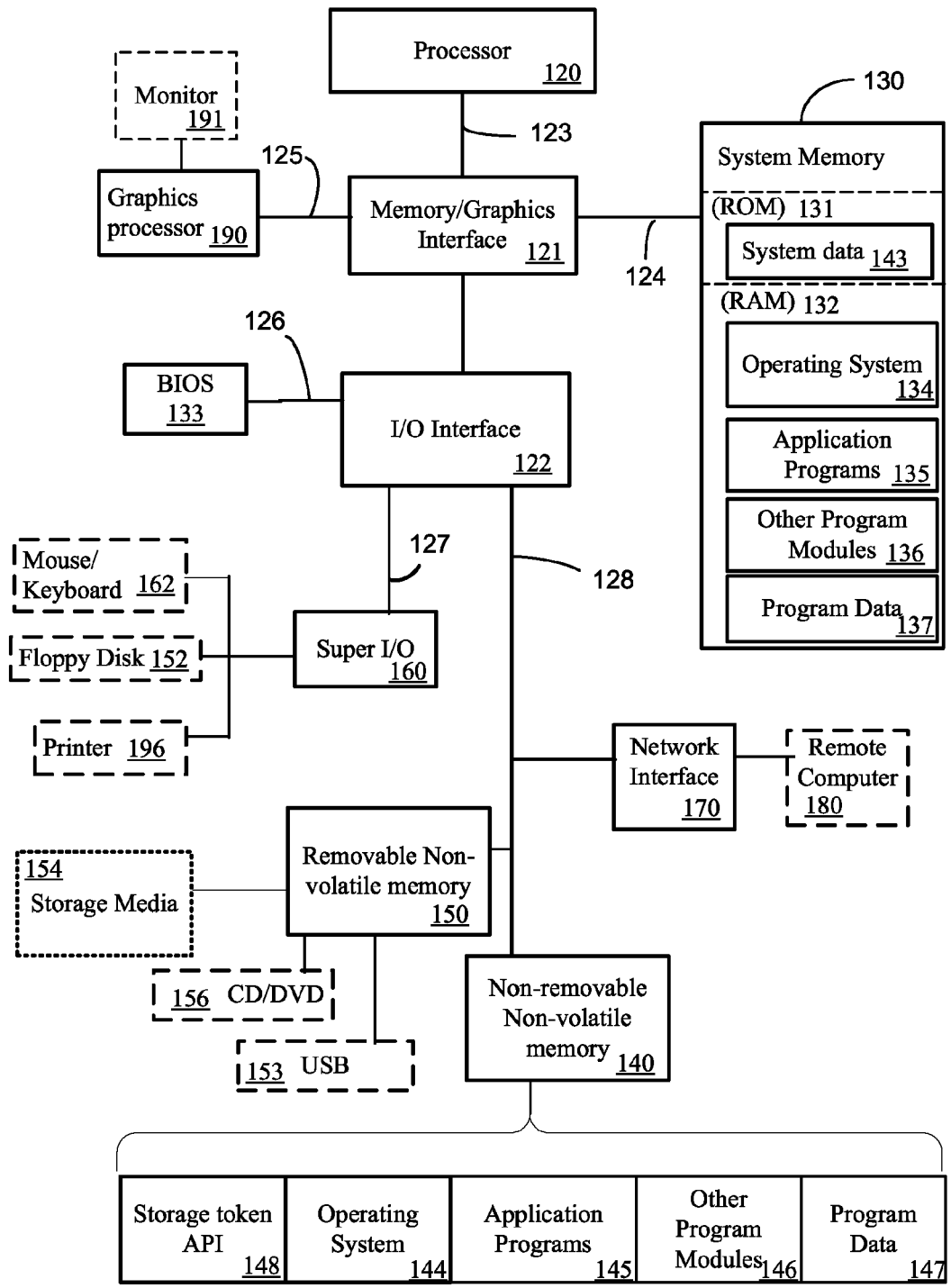
FIG. 1 is a block diagram of a general purpose computing device in communication suitable for hosting image-guided abstraction of building facades.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive or may be similar to the storage media described below with respect to FIG. 2.

Removable media, such as a universal serial bus (USB) memory 153, firewire (IEEE 1394), or CD/DVD drive 156 may be connected to the PCI bus 128 directly or through an interface 150. A storage media 154 similar to that described below with respect to FIG. 2 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 2:
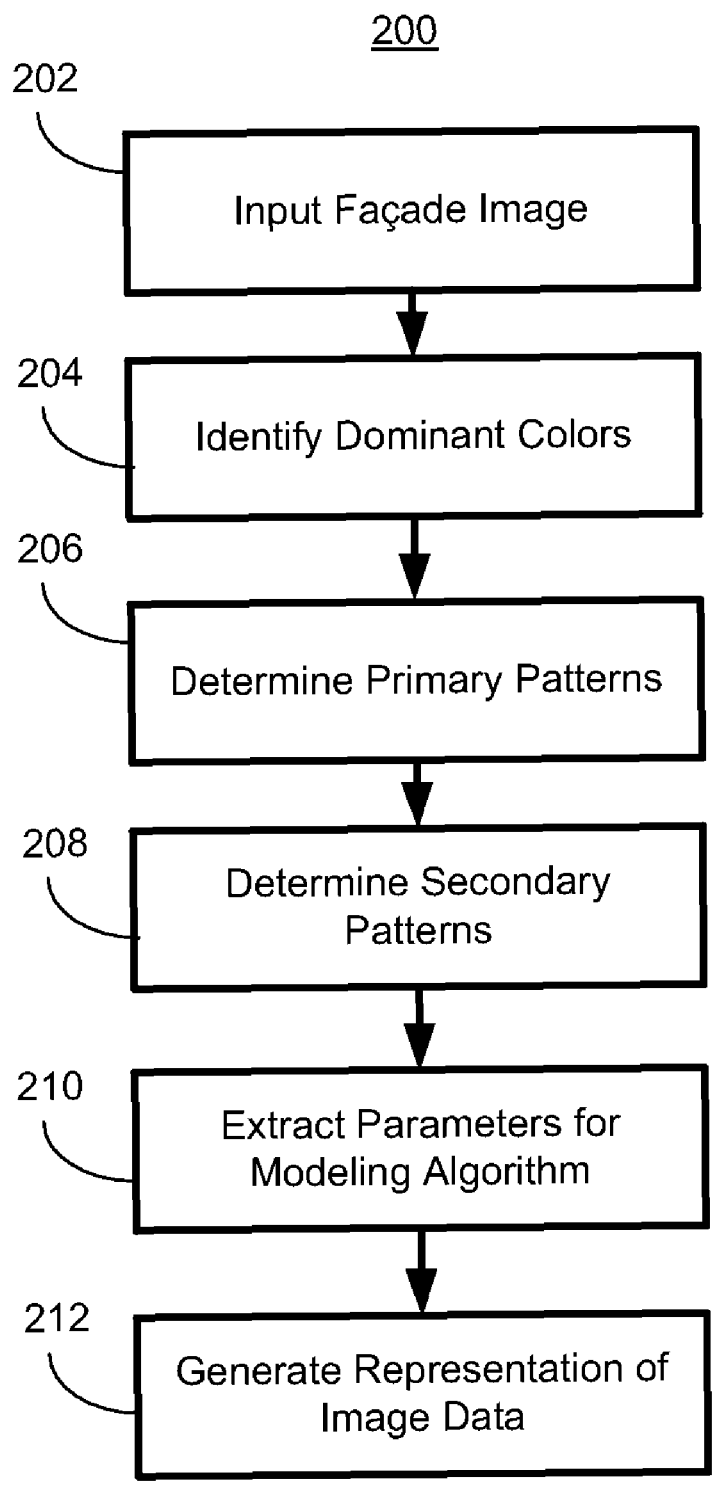
FIG. 2 is a flow chart of a method of modeling image data.

FIG. 2 is a flow diagram of an example method of modeling image data. At block 202 image data may be captured. The image data may be a photograph, an artistic rendering, polygon-based image, etc.

At block 204, the image data may be processed to determine a first and second dominant color. In some cases, three to five total colors may be used, depending on the frequency of their presence and the level of modeling detail to be retained in the final output. Color is a key perceptual property of a building and may be the single most prominent trait by which it can be identified. Usually two or three dominant colors are usually sufficient to represent a building or other landmark, particularly in the case of a panoramic map or landscape, with items displayed from a distance. Two exemplary techniques will be discussed. One is hashing. The other is clustering, such as Tree Structured Vector Quantization (TSVQ). Of course, other techniques for determining color groupings may also be used.

I. Hashing and Averaging the Colors.

The principle behind this mechanism is to divide the entire RGB color space into different buckets, or color classifications and hash the image colors into them. An L2 distance metric may be used for the hash function. The bucketing mechanism can be broadly classified in 2 categories, static and dynamic bucketing.

The two methods predominantly differ in how the buckets are created and sized. Each mechanism is briefly described below.

Static Bucketing

In static bucketing, the bucket size is user-defined or hard-coded to divide the color space into the buckets of defined size. Static bucketing also allows having different bucket sizes for different colors, for example, for each of red (R), green (G), and blue (B). This enables a user to fine tune the bucketing or color classification and color mapping by varying each bucket size independently. Buckets may be formed linearly encompassing color values from 0 to 255 for each component color. In some embodiments, other color depths may be used.

Dynamic Bucketing

Dynamic bucketing determines bucket sizes on the fly. Unlike static bucketing with buckets ranging from 0 to 255, dynamic bucketing may use the mean value of the color map and move on either side of it with the 1st bucket being the biggest of $2\sigma$ ($\sigma$=Standard Deviation of the color from its mean value) size (others being equal to $\sigma$).

This mechanism allows automation of the process of generating buckets and also takes care of image statistics. Skewness and kurtosis analysis may also be used to formulate bucket sizes and locations.

Adaptive Bucketing

Bucketing alone may not accurately account for two very close colors (close in terms of L2 distance) may result in a single color identification when two or three colors are more appropriate. To select the dominant colors and minimize loss of information, a mechanism of merging and choosing buckets may be used, as described below.

When merging, the top 10 color buckets may be selected (based on the number of pixels that map to that bucket) and lower buckets with the closet L2 distance may be merged and averaged, until the desired number of buckets is reached.

II. Clustering Colors Using Tree Structured Vector Quantization Followed by Histogram Analysis.

A Tree Structured Vector Quantization (TSVQ) algorithm recursively computes centroids from the given data set, and are often used in various applications of data compression. In one embodiment, this algorithm is applied to the image data to find the dominant colors. The image data is input as a set with a 3 dimensional array containing the pixel color values. The output is the specified number of centroids. Input control parameters for this approach may include, a number of iterations, a number of colors to reduce to, and a number of centroids to calculate.

Any of the described approaches may work when classifying dominant colors, with some approaches giving better results depending on the original image data. Other suitable algorithms for determining dominant colors and their weight may also be chosen. After the dominant colors are determined, execution may continue at block 206.

At block 206, primary patterns in the image data may be determined. Particularly in a modern skyline of buildings, a regular pattern usually emerges in both the horizontal and vertical directions. Working from that assumption, primary and, if required, secondary patterns may be developed. The effect of skewing in the original image data, resulting, for example, from photographic data captured at an oblique angle may also be reduced. At block 208, determination of secondary patterns may optionally be performed. Pattern determination and skew correction is discussed in more detail below with respect to FIGS. 3-7.

At block 210, square waves associated with primary and secondary patterns for image data features are generated in both the horizontal and vertical directions by projecting coded image data in both directions, as explained in more detail below. By performing a Discrete Fourier Transformation or Haar Wavelet Transform on the resulting square waves, coefficients for the polynomials representing the horizontal and vertical patterns may be generated. By discarding, or setting to zero, lower order coefficients, data size and pattern regeneration complexity can be varied as needed. These transforms are discussed in more detail below with respect to FIG. 8.

At block 212, inverse transforms can be used on the remaining coefficients to generate the horizontal and vertical waveforms associated with their respective patterns, and an abstraction of the original image data rendered. Examples of the results are discussed below with respect to FIGS. 9 and 10.

Figure 3:
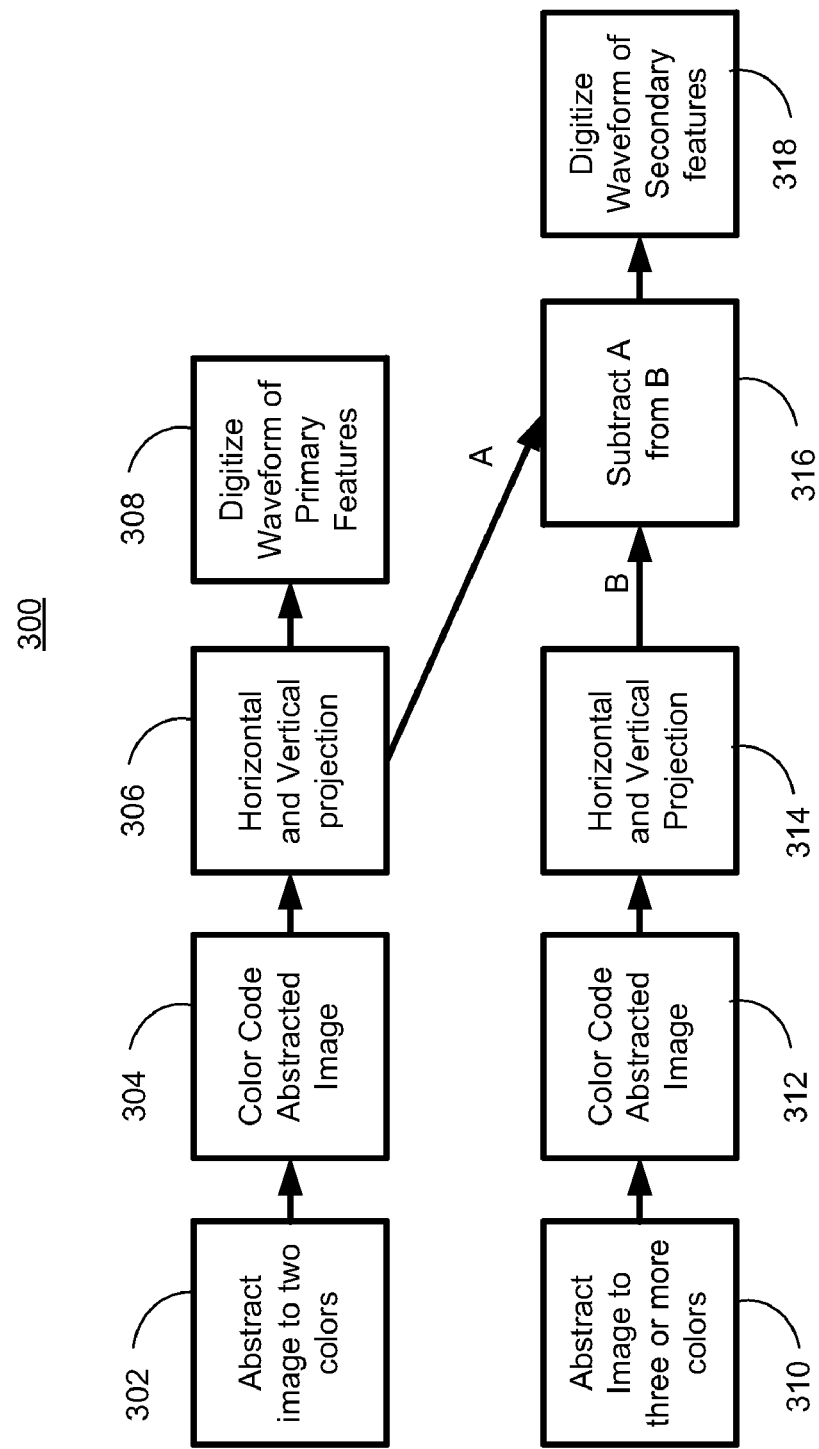
FIG. 3 is a flow chart of a method 300 of determining primary and secondary features.

FIG. 3, a method 300 of determining primary and secondary features is discussed and described, as referred to at block 206 of FIG. 2. At block 302, the results of the primary color determination is retrieved, as necessary.

Figure 4:
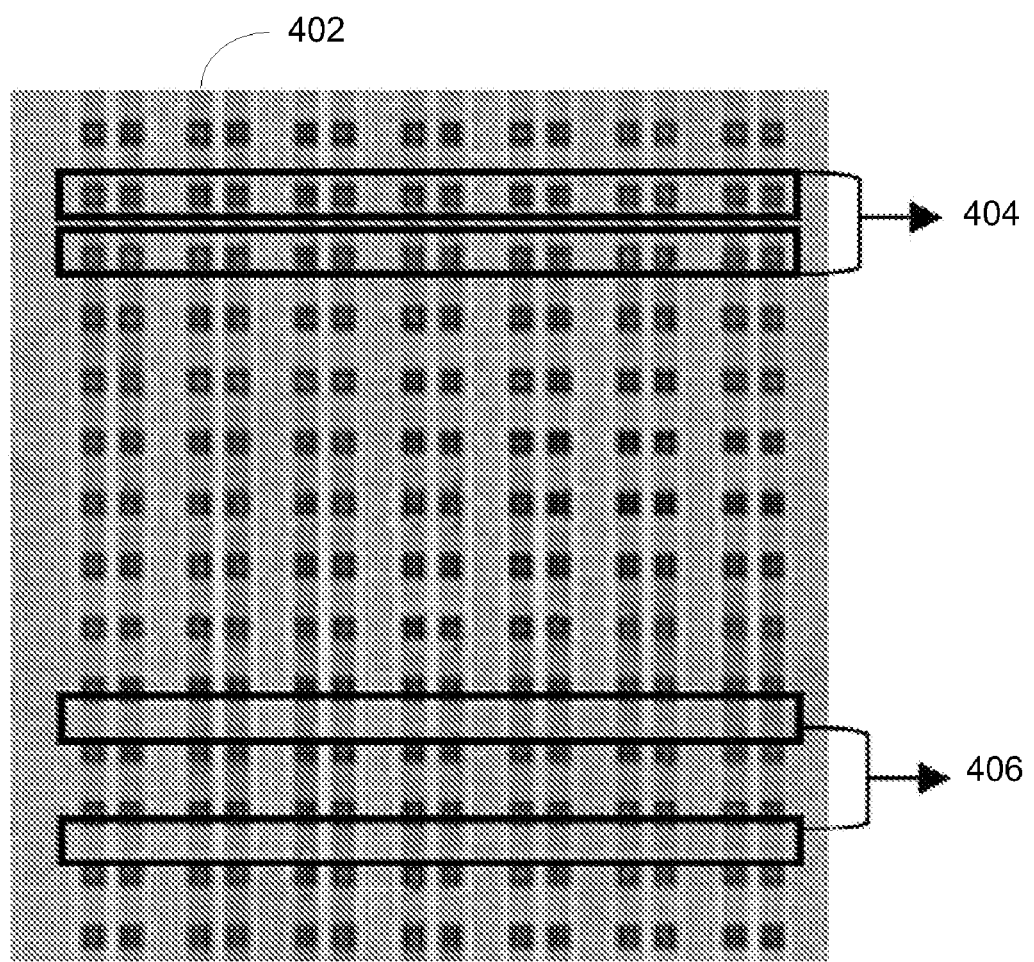
FIG. 4 is a diagram showing structural features in a building facade.
Figure 5:
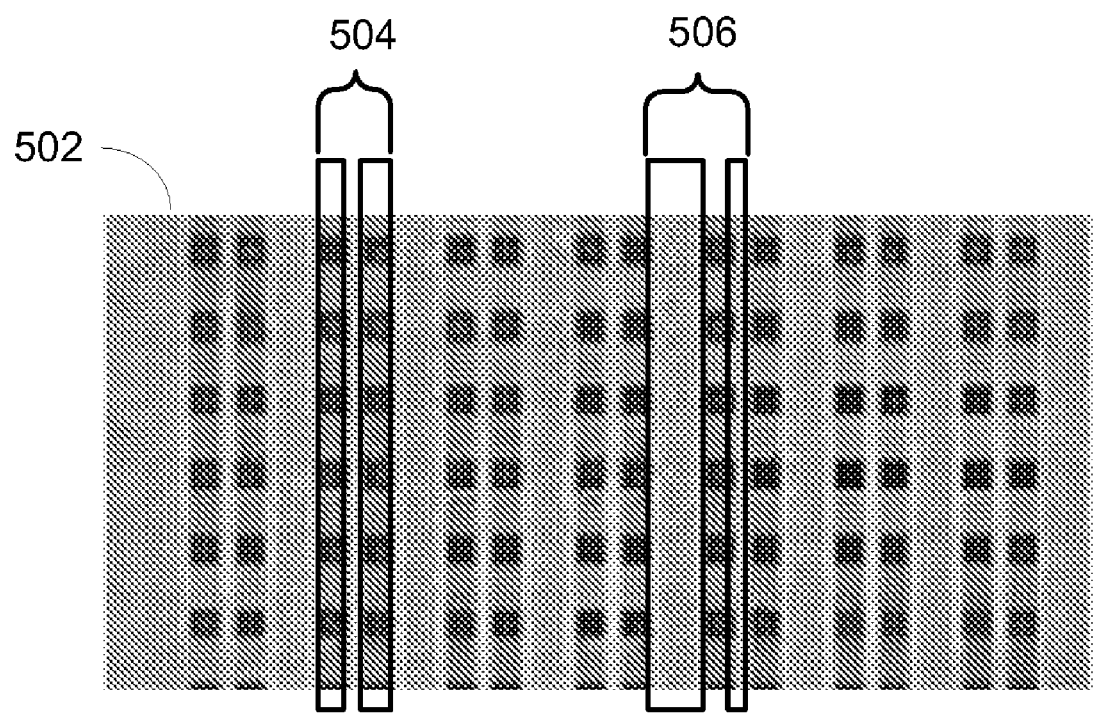
FIG. 5 is another diagram showing structure features in a facade.

At block 304, a copy of the original image data may be rendered using only the two or three most dominant colors. Since these colors occur with the highest frequency, an assumption is made that they represent the primary structural features of the object represented by the image data, for example, in a building, the primary structural features may be windows and walls. To illustrate, refer briefly to FIG. 4, showing primary and secondary color effects in a building facade 402. The rows 404 illustrate horizontal slices including walls and windows, the two most dominant colors in the rendered image data. Rows 406 show horizontal slices of the re-rendered image including a space below the windows containing a third most dominant color, which were blue in the original image data. Similarly, FIG. 5 shows a building facade 502 of the same image illustrated in FIG. 4. The vertical slices 504 incorporate the windows and the spaces below while vertical slices 506 show the wall sections.

At block 306, a horizontal and a vertical projection of the rendered image may be generated using only the first and second most dominant colors. In the process of generating the rendered image, the most dominant color may be set to 0, the second most dominant to 1. Horizontal and vertical projections of the image are taken, as discussed in more detail below with respect to FIGS. 6-7.

At block 308, the waveforms generated by the horizontal and vertical projections may be digitized around their respective threshold values. Digitization of the projections is discussed in more detail below with respect to FIG. 8. The digitized waveforms effectively define for each pixel, one of two color values for that pixel of the rendered image, corresponding to block 206 of FIG. 2. Secondary features may be extracted as follows at block 310.

At block 310, color information for additional colors occurring in smaller quantities may be extracted, as discussed above.

At block 312, the image may be rendered again using these additional colors but still including the primary colors as used above in blocks 302 to 308. When creating the rendered image, the third, fourth, fifth, etc. colors may be assigned increasing ordinal numbers, e.g. the third most dominant color is assigned number 2, and the fourth most dominant color assigned number 3, etc.

At block 314, the horizontal and vertical projection processes, discussed below, may be repeated, this time including the additional colors. Because a projection "slice" may include additional colors, with higher assigned values, the projection values will always be greater than or equal to the projections generated at block 306.

At block 316, the values generated at block 306 may be subtracted from the values generated at block 314, resulting in horizontal and vertical waveforms with values at zero or above.

At block 318, the resulting waveforms may be digitized and represent horizontal and vertical structural features contributed by colors with lower dominance than the two primary colors, corresponding to block 208 of FIG. 2. The use of secondary colors/features is optional and in many cases their use may not significantly increase the ease of recognition of a building.

Structural Property Identification

Apart from color, the structural properties of image data, such as a building, are important for ease of identification. Therefore, this property of the building facade may be captured and used for recreating an abstract representation of the building. To accomplish this, the features in a building facade are captured based on their prominence. The primary features are defined by the distribution of the two most dominant colors of the facade. Similarly, secondary features are defined by the distribution of the third dominant color on the facade, and so on (see FIGS. 4 and 5). A method of horizontal and vertical projection may be used to determine the structural features of the image data, such as a building facade. As discussed above, the original facade image is rendered using only the dominant colors and then an indexed image is created, where 0 represents the most dominant color, 1 represents the next dominant color, and so on. A projection of the resulting image in the horizontal and vertical direction is generated using the indexed image. That is if P is the rendered image with an m×n size, C an be the m×n image that is created by replacing the colors with indices. This color coded image is projected in the horizontal and vertical directions resulting in waveforms WH of dimension n and WV of dimension m given by:

$$WH_i = \sum_{j=1}^{n} C_{ij}$$

$$WV_j = \sum_{i=1}^{m} C_{ij}$$

where $WH_i$ represents the value of the $i^{th}$ element in the horizontal wave and $WV_j$ represents the value of the $j^{th}$ element in the vertical waveform. $Cij=0$ if $Pij$ is the most dominant color, $Cij=1$ if $Pij$ is the second most dominant color, and so on.

Figure 6:
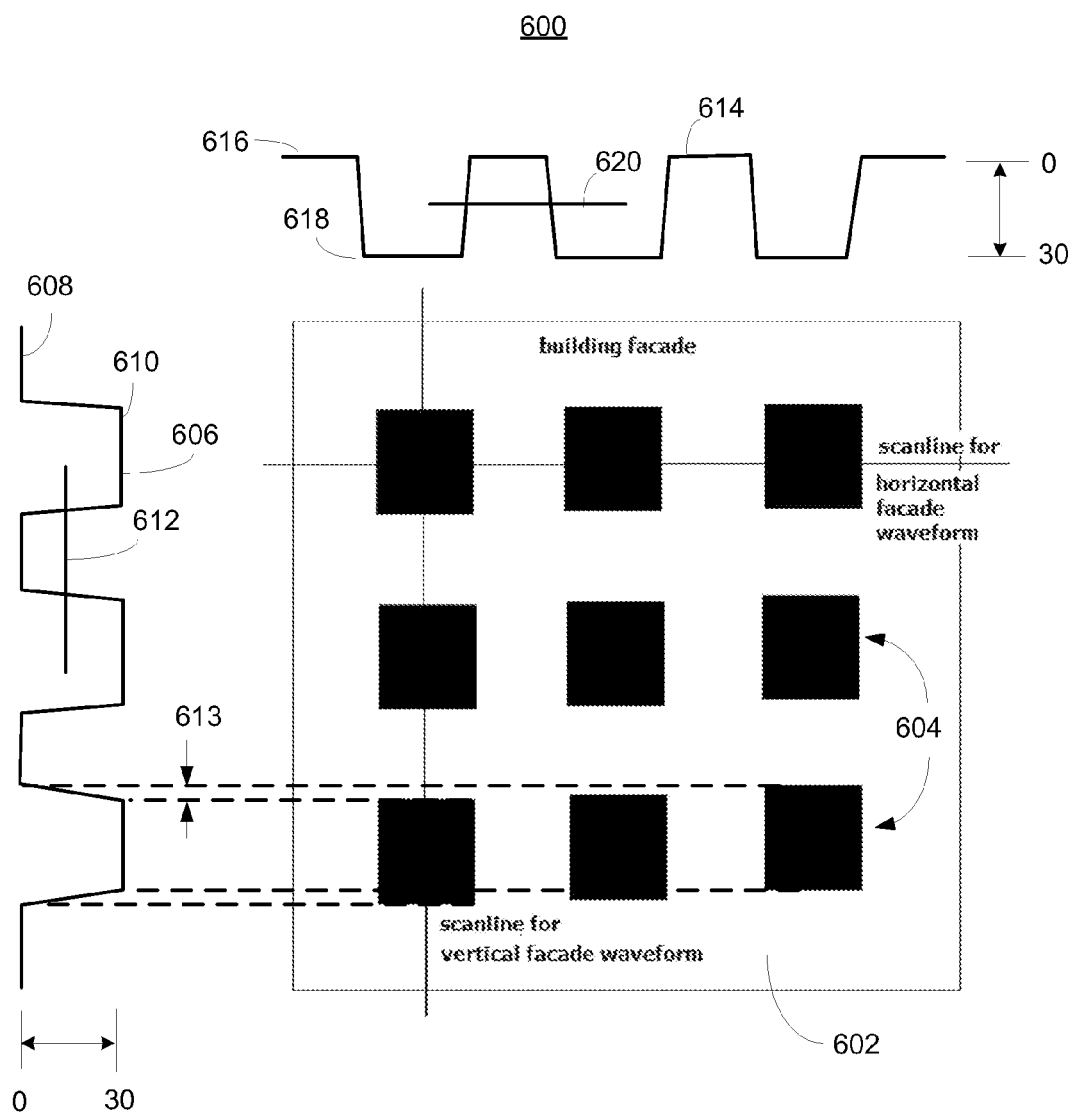
FIG. 6 is a diagram showing horizontal and vertical projections of image data.

FIG. 6, illustrating the horizontal and vertical projections of the rendered image 600, illustrates this process. The rendered image 600 shows a wall portion 602 and a window portion 604. With the dominant color of the wall portion 602 assigned a value of 0 and the second most dominant color of the windows 604 assigned a value of 1, the sum of all pixels projected horizontally is shown in graph 606.

As shown below the graph 606, the minimum value 608 has a value of zero because horizontal projections across the wall-only regions are the sum of pixels with color values of zero. The maximum value 610 occurs wherever three windows 604 are in horizontal alignment. As a simple illustration, assume each window 604 has 10 pixels in each dimension with an assigned color value 1 each. The graph 606 will have a maximum value of 30 resulting from the addition of the ten pixels of value one for each of the three windows. A threshold value 612 may be calculated, in this case, the average of minimum and maximum values. The threshold value is used below in step 308.

Because of a certain amount of skew 613 in the image (either from the original building or as a result of capture of the image data from an oblique angle), each window 604, as shown, is not aligned along the horizontal and vertical axes. As a result, the transitions between minimum values 608 and maximum values 610 are not vertical, but have a certain slope corresponding to the skew 613.

A graph of the vertical projection 616 has a similar minimum value 614 of zero and a maximum value 618 of 30. A threshold value 620 may also be assigned for the vertical projection graph 616, in this example, the average of minimum value 616 and maximum value 618.

Figure 7:
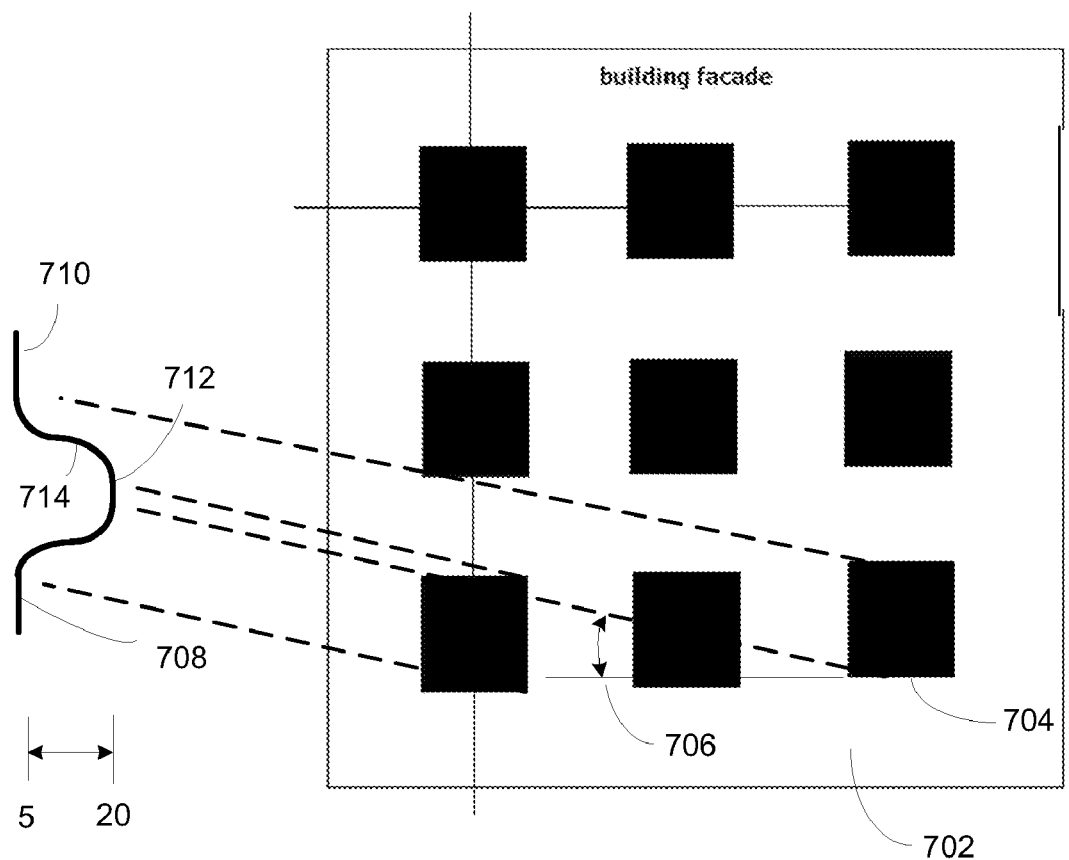
FIG. 7 illustrates skew correction of image data.

FIG. 7 illustrates skew correction. As above, the image data has a wall portion 702 and a series of windows 704. When generating the horizontal and vertical projections, as described in FIG. 6, projections may be taken at an angle 706. Representative graph 708 illustrates that most, if not all of the individual projections will have a window component. Therefore, the minimum value 710 may be above zero, e.g. 5. Similarly, no single projection may have a slice through the full width of each window region 704, so that the maximum value 712 may be below 30, e.g. 20. The transition area of the graph 714 will be longer. By taking projections at various angles and selecting an angle at which the difference between minimum and maximum values is greatest or having the largest area under the curve, the orientation of the horizontal structural features may be determined. The process may be repeated for vertical projections to determine an orientation for the vertical structural features. The projections corresponding to the horizontal and vertical feature orientations may be used in subsequent steps.

Figure 8:
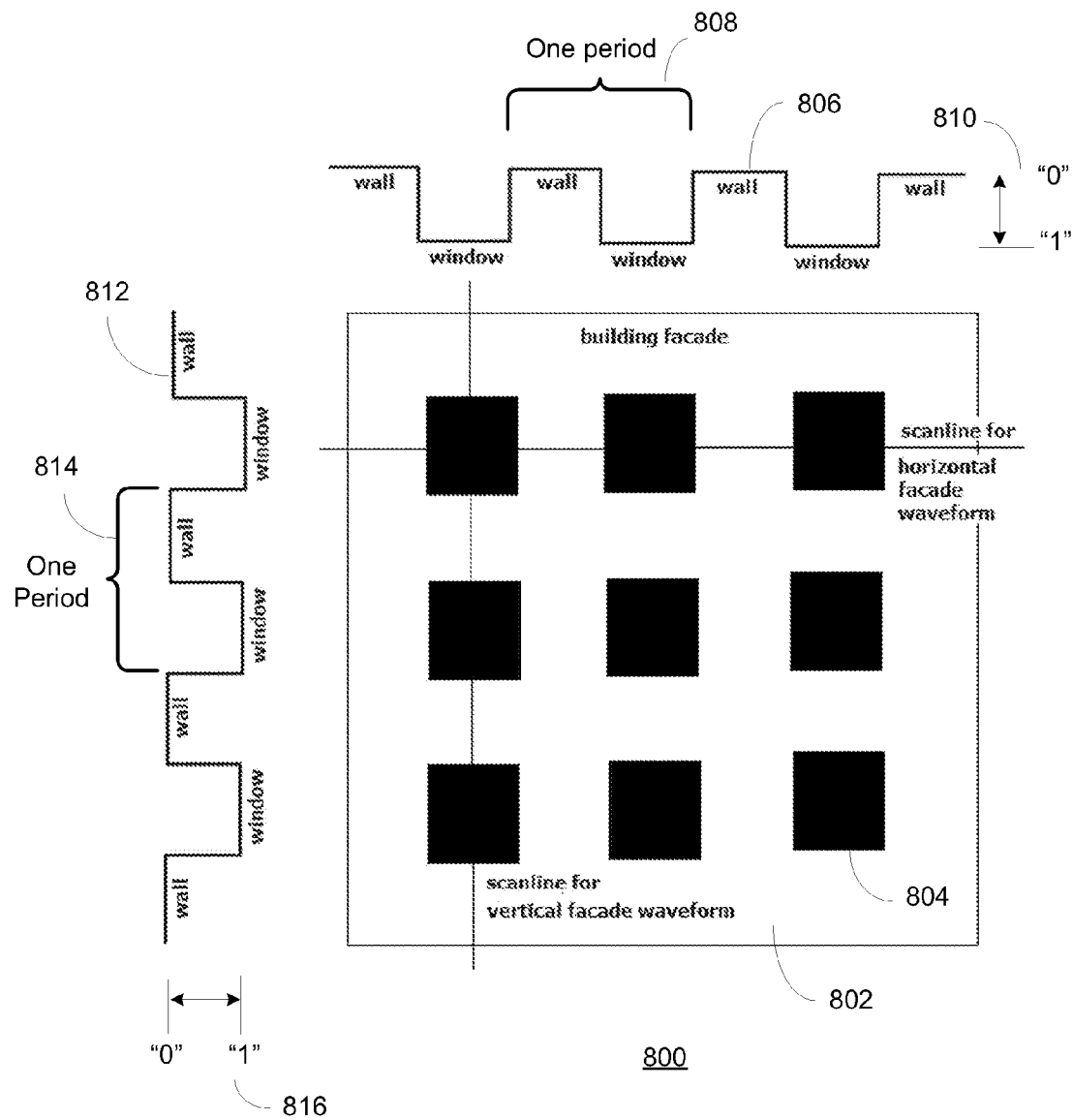
FIG. 8 illustrates digitization of horizontal and vertical projections.

FIG. 8 illustrates digitization of horizontal and vertical projections. The values making up the waveforms 606 and 614 of FIG. 6 may compared to their respective threshold values 612 and 620. Any value above the threshold may be assigned a digital value of 1 and any value at or below the threshold may be assigned a digital value of 0. Of course, other digitization algorithms may be applied. The result are digitized waveforms 806 and 812, with representative scale 816 illustrating the digitization process of the horizontal projection.

The digitized waveform may be characterized by an equation describing the waveform. Many techniques may be employed to describe the waveforms, such as vertex coordinates. Other techniques may include a Discrete Fourier Transform (DFT) and a Haar Wavelet Transform.

Recognizing that virtually all building facades are periodic, that is, they incorporate a repeating pattern, a DFT may be performed on a both square waves 806 and 812. The results will include a set of numeric coefficients of the DFT. The accuracy of a reconstruction of the waveform using an Inverse DFT is a function of how many coefficient terms are retained. The reconstructed waveform will represent presence of one or the other of two primary colors, in a two color system. When size reduction is desirable, more terms may be discarded or set to zero. When more accuracy in the abstracted version is desirable, more terms may be saved. An estimate of the periodicity of the waveform may improve the overall results in terms of accuracy and compression by performing the DFT on an single period of each waveform rather than running the DFT on the entire waveform.

To estimate the period, a maximum length of a run of value "1" may be added to a maximum length of a run of "0" as shown by runs 808 and 814. By calculating the DFT over a single period, there is empirical evidence that as few as five coefficients provide a satisfactory result, when a DFT of the full waveform may require as many as fifty coefficients. When a facade or other image data includes complex structures, such an approximation may not be as effective. An analysis of run lengths of 1 and 0 values can be used to determine structure complexity.

When a pattern is identified, a tile can be created that represents a portion of the image data that contains all the relevant image data. When reconstructing an abstracted image, the tile information may be repeated over the entire facade.

Figure 9:
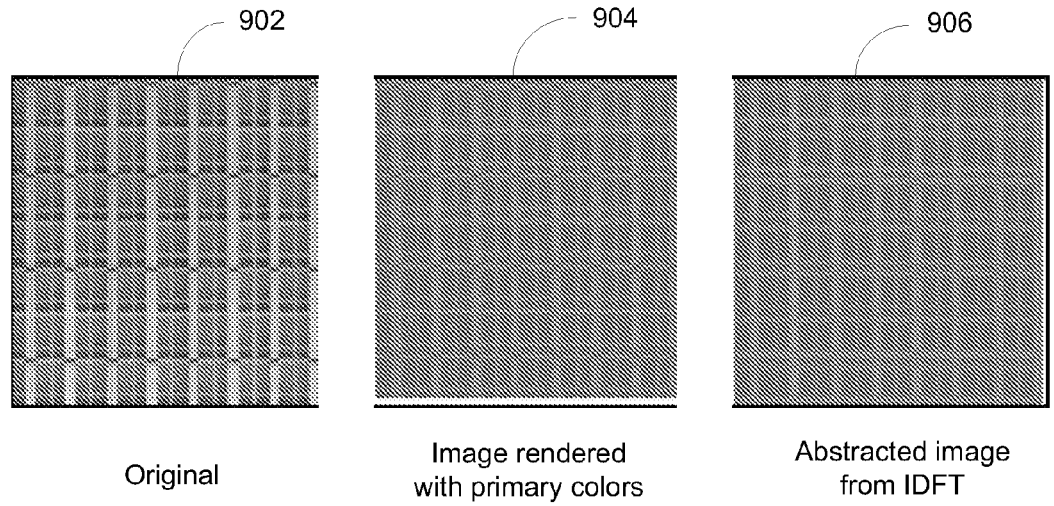
FIG. 9 shows an example of image abstraction.
Figure 10:
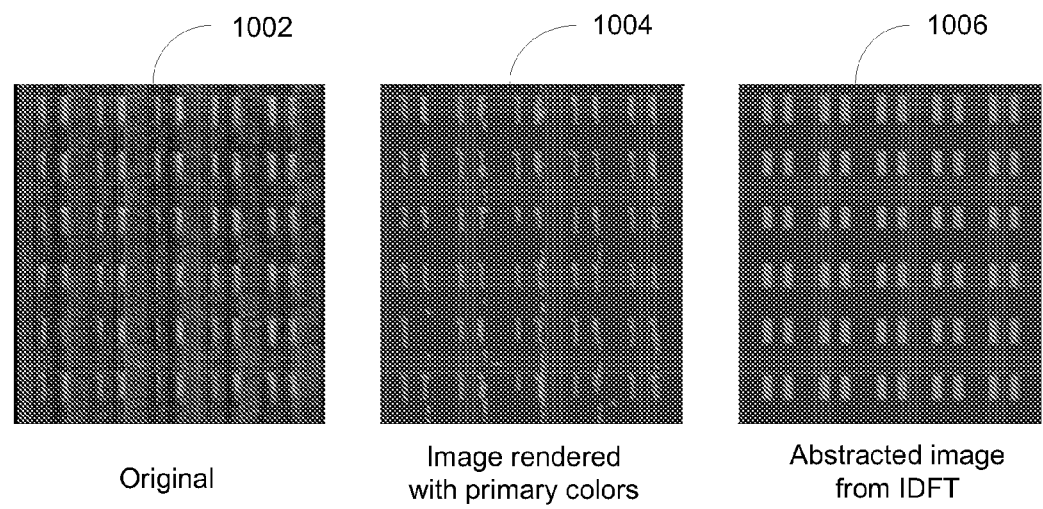
FIG. 10 shows another example of image abstraction.

FIGS. 9 and 10 illustrate image abstraction. Image data 902 and 1002 illustrate original images of building facades. Rendered images 904 and 1004 illustrate rendering the image data using two primary colors. Reconstructed, abstracted, images 906 and 1006 show resulting images after waveform processing using the DFT, with reconstruction via an IDFT.

Similarly, a Haar Wavelet Transform can be used to describe the waveforms 806 and 812. Skipping lower order coefficients allows reconstruction of the abstraction at various resolutions.

Figure 11:
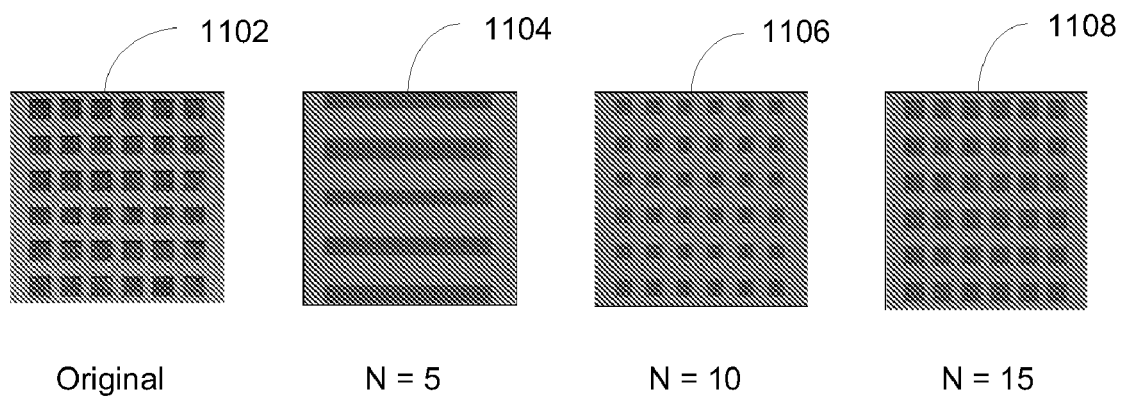
FIG. 11 illustrates DFT coefficient effect on waveform reconstruction.

FIG. 11 illustrates an example of DFT coefficient effect on waveform reconstruction in a two color abstraction. Image 1102 illustrates an original image. Image 1104 shows an abstracted image using 5 coefficients for the IDFT. Images 1106 and 1108 illustrate use of 10 and 15 coefficients, respectively.

Figure 12:
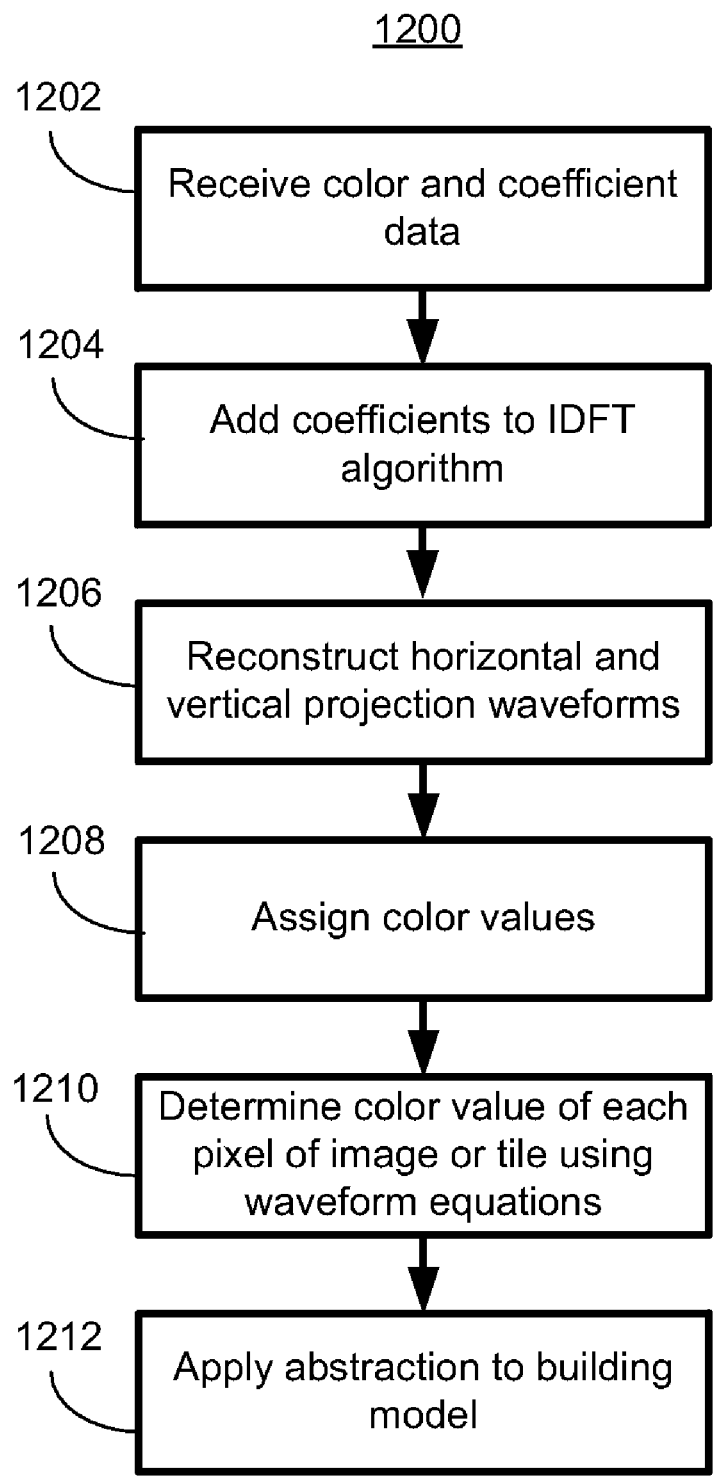
FIG. 12 is a flow chart of a method of creating an abstracted image.

FIG. 12 is a flow diagram of an example method 1200 of creating an abstracted image on a target device. At block 1202, color and coefficient data may be received representing an image to be abstracted. Screen location and extents may also be included. For example, in a two color system, red, green, blue (RGB) data for each color may be passed. DFT coefficients may also be passed. For example, for two colors and five coefficients, the following ascii data may be received: 223 123 135, 123 223 163, 0.4367, 1.2343, 0.1297, 0.6309, 1.2344; 0.3342, 1.4345, 0.5832, 0.0393, 0.4891.

At block 1204, the received coefficients may be added to the well known IDFT equation.

At block 1206, the IDFT may be calculated to reconstruct the horizontal and vertical waveforms. At block 1208, the color values received may be assigned to first and second pixel values.

At block 1210, the value of each pixel of the abstracted image may be calculated using an inverse of the projection process described above. At block 1212, the abstracted color image may be mapped to a screen location or onto a building model for rendering on a display, such as monitor 191 of FIG. 1.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of modeling image data performed by a computing device comprised of a processor and storage storing the image data, the method comprising:

determining, by the processor, a first and second dominant color and storing in the storing information identifying the first and second dominant colors;

identifying, by the processor, a structural feature of the image data and storing information identifying the structural feature in the storage;

extracting, by the processor, modeling parameters from the structural feature and stroing the modeling parameters in the storing; and generating by the processor a model of the image data for generating a representation of the image data and storing the model in the storage.

2. The method of claim 1, wherein determining the first and second dominant colors comprises:

defining at least two color classifications;

selecting a color range for each of the at least two color classifications;

sorting each color present in the image data into one of the at least two color classifications;

selecting the first dominant color as a first color associated with a color classification from the at least two color classifications having a highest number of occurrences from the sorting of each color present; and selecting the second dominant color as a second color associated with another of the at least two color classifications having a second highest number of occurrences from the sorting of each color present.

3. The method of claim 2, wherein the sorting each color present in the image data comprises hashing color values into the at least two color classifications.

4. The method of claim 3, further comprising selecting a first color classification using a mean color value of the image data.

5. The method of claim 4, further comprising selecting a second color classification according to a standard deviation of the mean color value of the image data.

6. The method of claim 1, wherein the image data comprises pixels, and wherein the determining the first and second dominant color comprises:
calculating a set of centroids from a centroid for each pixel of the image data using pixel color values;
performing a histogram analysis on the set of centroids; and
selecting the first and second dominant color from the histogram analysis.

7. The method of claim 1, wherein the identifying the structural feature of the image data comprises:
reconstructing the image data using the first and second dominant colors;
developing a first waveform from a horizontal projection of the first and second dominant colors;
developing a second waveform from a vertical projection of the first and second dominant colors;
selecting a first and second threshold value for the first and second waveforms, respectively;
generating a first square wave corresponding to a horizontal structural feature by digitizing the first waveform around the first threshold value; and
generating a second square wave corresponding to a vertical structural feature by digitizing the second waveform around the second threshold value.

8. The method of claim 7, wherein the developing the first waveform and the developing the second waveform further comprise:
developing a series of first waveforms from a series of horizontal projections at varying angles;
selecting the first waveform using one of the horizontal projections with an angle having a maximum difference between high and low first waveform values;
developing a series of second waveforms from a series of vertical projections at varying angles;
selecting the second waveform using one of the vertical projections with an angle having a maximum difference between high and low second waveform values.

9. The method of claim 7, wherein the extracting modeling parameters from the structural feature comprises:
performing a Discrete Fourier Transform (DFT) on the first square wave to create a first DFT result;
performing another Discrete Fourier Transform on the second square wave to create a second DFT result;
retaining a selected number of coefficients of the first and second DFT results to create first and second trimmed DFT results;
performing Inverse Discrete Fourier Transforms on the first and second trimmed DFT results; and
determining a mean threshold and digitizing each of the first and second trimmed DFT results to create modeling parameters from the structural feature.

10. The method of claim 9, further comprising:
computing a maximum length for which each of the first and second square waves have a value of 1 and 0 to determine a period for each square wave, respectively; and
performing the DFT on the first square wave over one period of the first square wave to allow reduction of the selected number of coefficients;
performing the other DFT on the second square wave over one period of the second square wave to allow reduction of the selected number of coefficients.

11. The method of claim 9, further comprising:
creating modeling parameters for one period of each of the first and second square waves representing a tile of the image data; and
generating the representation of the image data using successive tiles of the image data.

12. The method of claim 7, further comprising:
determining one or more secondary colors;
reconstructing the image data using the first and second dominant colors and the one or more secondary colors;
developing a third waveform from another horizontal projection of the first and second dominant colors and the one or more secondary colors;
developing a fourth waveform from another vertical projection of the first and second dominant colors and the one or more secondary colors;
subtracting the first waveform from the third waveform to identify a secondary horizontal structural feature of the image data; and
subtracting the second waveform from the fourth waveform to identify a secondary vertical structural feature of the image data.

13. The method of claim 7, wherein extracting modeling parameters from the structural feature comprises:
performing a first Haar wavelet transform on the first square wave;
performing a second Haar wavelet transform on the second square wave; and
selecting a number of coefficients of the first and second Haar wavelets corresponding to a desired resolution of the model of the image data.

14. The method of claim 1, further comprising:
adjusting the first and second dominant colors according to a lighting condition when generating a representation of the image data.

15. A method of constructing an image abstraction comprising pixels, the method performed by a computing device comprised of storage and a processor, the method comprising:
receiving and storing in the storage color information for at least two primary colors;
receiving and storing in the storage algorithm coefficients;
reconstructing, by the processor, horizontal and vertical binary projection waveforms using the algorithm coefficients;
assigning, by the processor, and storing the storage, color information for the at least two primary colors to the binary projection waveforms;
assigning, by the processor, and storing in the storage, color values to each pixel in the image abstraction using the horizontal and vertical projection waveforms; and
saving in the storage each pixel in the image abstraction.

16. The method of claim 15, wherein receiving algorithm coefficients comprises receiving Discrete Fourier Transform coefficients.

17. The method of claim 15, further comprising:
applying the image abstraction to a building model.

18. The method of claim 15, further comprising:
receiving color information for a third primary color; and
assigning the third primary color information to the binary projection waveforms.

19. The method of claim 15, wherein the reconstructing horizontal and vertical binary projection waveforms is performed using a Haar wavelet transform.

* * * * *